United States Patent [19]
Berner et al.

[11] Patent Number: 5,435,976
[45] Date of Patent: Jul. 25, 1995

[54] DEVICE FOR INTRODUCING A REACTANT INTO A GAS FLOW

[75] Inventors: Gerhard Berner, Hessdorf; Günther Proebstle, Erlangen; Lothar Balling, Fuerth, all of Germany

[73] Assignee: Siemens Aktiengesellschaft, Munich, Germany

[21] Appl. No.: 98,227

[22] Filed: Jul. 27, 1993

[51] Int. Cl.⁶ .................. B01D 53/56; B01D 53/90; B01F 5/06
[52] U.S. Cl. .................. 422/168; 137/561 A; 222/459; 239/418; 366/337; 366/340; 422/176
[58] Field of Search ............ 422/168, 176, 177, 182, 422/183, 220; 366/336, 337, 340; 423/235, 239.1; 222/195, 459; 137/561 A; 239/553, 566, 418

[56] References Cited

U.S. PATENT DOCUMENTS

| | | | |
|---|---|---|---|
| 3,650,292 | 3/1972 | Platz et al. | 137/561 A |
| 4,401,626 | 8/1983 | Lewis | 239/432 X |
| 4,674,888 | 6/1987 | Carlson | 366/337 |
| 4,820,492 | 4/1989 | Wada et al. | 422/111 |
| 4,950,473 | 8/1990 | Flockenhaus et al. | 423/235 |
| 5,099,879 | 3/1992 | Baird et al. | 137/561 A |
| 5,246,471 | 9/1993 | Bhat et al. | 55/223 |

FOREIGN PATENT DOCUMENTS

| | | |
|---|---|---|
| 0317706 | 5/1989 | European Pat. Off. . |
| 8803103 | 4/1988 | Germany . |
| 3722523 | 6/1988 | Germany . |
| 3723618 | 12/1988 | Germany . |
| 3823034 | 1/1989 | Germany . |
| 3706371 | 2/1989 | Germany . |
| 3735112 | 12/1989 | Germany . |

Primary Examiner—Robert J. Warden
Assistant Examiner—Robert Carpenter
Attorney, Agent, or Firm—Herbert L. Lerner; Laurence A. Greenberg

[57] ABSTRACT

A device for introducing a liquid or gaseous reactant into a gas flow includes at least one outlet opening for the emergence of a reactant flow in a direction counter to a gas flow direction. At least one baffle is disposed upstream of the at least one outlet opening, as seen in the gas flow direction, for splitting the reactant flow emerging from the at least one outlet opening into at least two partial flows. At least one mixing element is preferably downstream of the at least one outlet opening, as seen in the gas flow direction, for turbulent mixing of the reactant and/or the gas flow.

24 Claims, 2 Drawing Sheets

DEVICE FOR INTRODUCING A REACTANT INTO A GAS FLOW

BACKGROUND OF THE INVENTION

1. Field of the Invention

The invention relates to a device for introducing a liquid or gaseous reactant into a gas flow, having at least one outlet opening for the emergence of the reactant. In particular, the invention may be used with deNOx catalysts in eliminating nitrogen oxides $NO_x$ from flue gases.

In the catalytic removal of nitrogen from flue gases by the SCR process, ammonia ($NH_3$) must be introduced or "injected" into the flue gas flow. A definitive factor for the extent of catalytic conversion is the uniformity of distribution of the ammonia in the flue gas prior to entry into the SCR catalytic converter. In constructing the flue gas channels and the catalytic converter geometry, the goal is to keep the mixing distances between the ammonia injection and the catalytic converter as short as possible. In that way, the structural height can be kept low, therefore keeping construction costs and finally the pressure losses low as well. In other words, in the "injection" of ammonia into a flue gas stream, or its admixture with the stream, the goal is to provide the completest possible mixing of ammonia and flue gas. However, it is also important to achieve the shortest possible distance between the outlet opening of the reactant and the adjoining catalytic converter.

Heretofore, the problem of complete mixing has been addressed by two different constructions:

1. The ammonia was injected at an adequate distance upstream of a first catalytic converter module plane. Such a "turbulent diffusion" as it is called, that is molecular transport as a consequence of turbulent motion of the flue gas and $NH_3$ flow, was the primary factor in bringing about mixing of the ammonia with the flue gas flow.

2. Mixer elements or turbulizers were built into flue gas channel between the ammonia injection and the catalytic converter.

Those two different constructions, while they did produce largely uniform mixing, nevertheless have a number of disadvantages: As a rule, long flue gas channels are provided, which entails correspondingly high costs. Often a different ammonia concentration must be added to the gas flow at various outlet openings over the flue gas channel cross section. In the startup phase, that involves relatively major measurement effort and expense, since accurate adjustment of the various ammonia concentrations over the flue gas channel cross section is necessary for the sake of final deNOx operation. When the aforementioned mixer elements were used, that meant additional costs for components and additional pressure losses.

SUMMARY OF THE INVENTION

It is accordingly an object of the invention to provide a device for introducing a liquid or gaseous reactant into a gas flow, which overcomes the hereinafore-mentioned disadvantages of the heretofore-known devices of this general type and which is provided with at least one outlet opening for the emergence of the reactant in such a way that good turbulent mixing, in other words homogeneous mixing, as well as a low structural height in the flow direction of the gas flow, are attained. In particular, the device should be suitable for producing a gas mixture for catalytic conversion by the SCR process.

With the foregoing and other objects in view there is provided, in accordance with the invention, a device for introducing a liquid or gaseous reactant into a gas flow, comprising at least one outlet opening for the emergence of a reactant flow in a direction counter to a gas flow direction; at least one baffle disposed upstream of the at least one outlet opening, as seen in the gas flow direction, for splitting the reactant flow emerging from the at least one outlet opening into at least two partial flows; and preferably at least one mixing element downstream of the at least one outlet opening, as seen in the gas flow direction, for turbulent mixing of the reactant and/or the gas flow.

In accordance with another feature of the invention, the at least one baffle is at least two crossed baffles disposed at the at least one outlet opening.

In accordance with a further feature of the invention, the at least two crossed baffles include one lengthwise baffle and one crosswise baffle with an angle of intersection of 90°.

In accordance with an added feature of the invention, there is provided at least one supply line for the reactant, the at least one supply line having a plurality of the outlet openings formed therein, each of the outlet openings being assigned at least one of the baffles.

In accordance with an additional feature of the invention, the at least one supply line is a plurality of supply lines extending parallel to one another being preferably disposed at the same mutual spacing, each having a plurality of outlet openings and each of the outlet openings being assigned at least one baffle.

In accordance with yet another feature of the invention, the baffles assigned to the outlet openings are laid out in a gridlike fashion and preferably produce a rectangular and especially a square pattern.

In accordance with yet a further feature of the invention, the at least one supply line is a plurality of supply lines being laid out in a gridlike fashion and preferably producing a rectangular and especially a square pattern.

In accordance with yet an added feature of the invention, the at least one mixing element is a vane disposed obliquely in the gas flow.

In accordance with yet an additional feature of the invention, the at least one mixing element is a vane being disposed obliquely in the gas flow and secured to the at least one supply line, for instance by welding.

In accordance with again another feature of the invention, the vane is triangular.

In accordance with again a further feature of the invention, the at least two crossed baffles include a number of lengthwise baffles and a number of crosswise baffles crossing at intersections, and the at least one outlet opening is a number of outlet openings disposed in the vicinity of the intersections.

In accordance with again an added feature of the invention, the at least one baffle is disposed at a distance, in particular from 30 to 100 mm, upstream of the at least one outlet opening, as seen in the gas flow direction.

In accordance with again an additional feature of the invention, the at least one baffle has a height of 300 to 500 mm.

In accordance with still another feature of the invention, the outlet openings have a diameter of approximately from 5 to 20 mm, and the outlet openings are mutually spaced apart by a distance of approximately 200 to 300 mm.

In accordance with still a further feature of the invention, the gas flow is a flue gas flow of a gas turbine.

In accordance with still an added feature of the invention, the reactant is ammonia.

In accordance with a concomitant feature of the invention, the at least one outlet opening is disposed upstream of a catalytic converter module, in particular an SCR catalytic converter module, containing plate-type or honeycomb-type catalytic converters.

Other advantageous features of the invention are defined by the dependent claims.

Other features which are considered as characteristic for the invention are set forth in the appended claims.

Although the invention is illustrated and described herein as embodied in a device for introducing a reactant into a gas flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
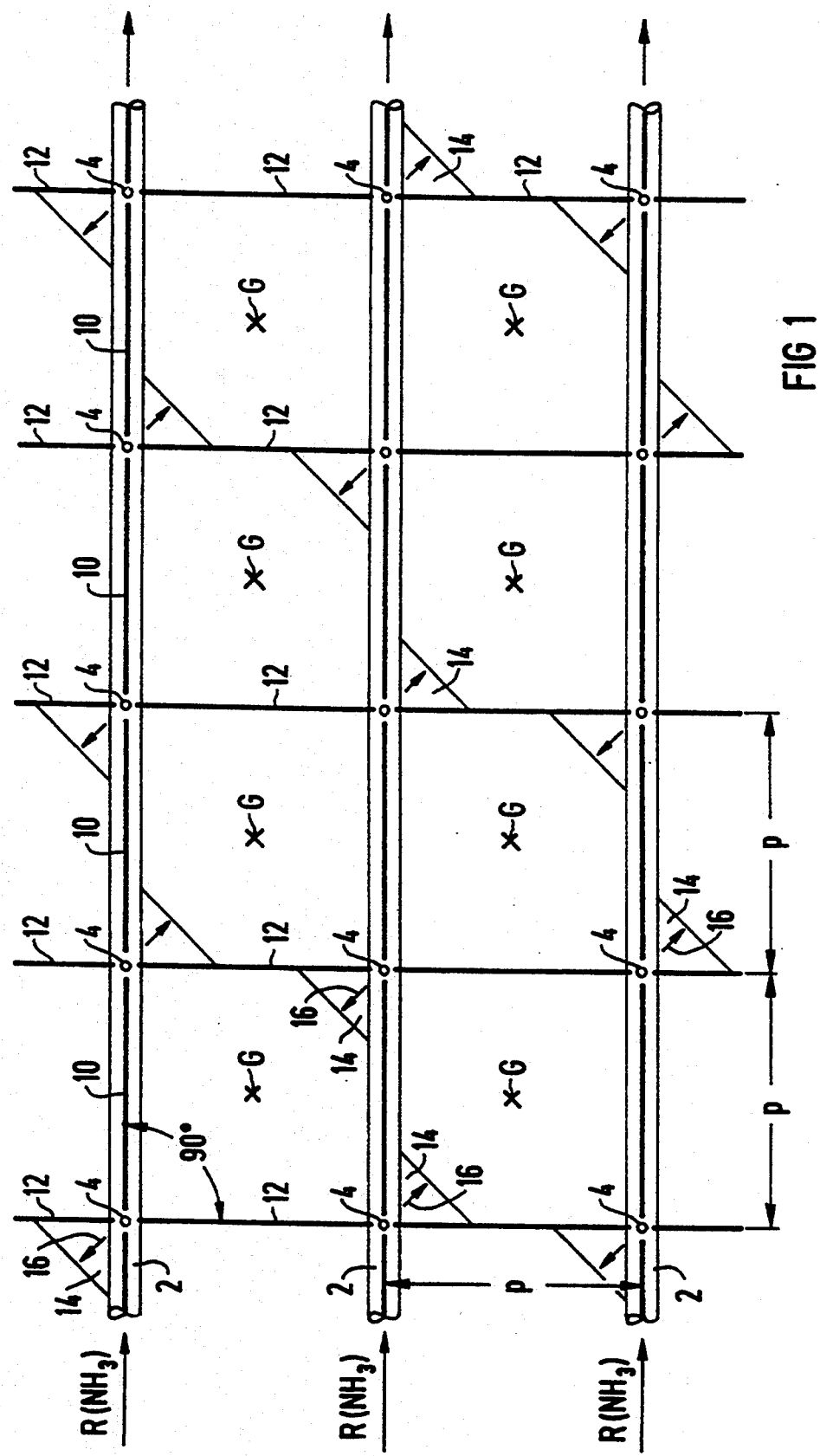
FIG. 1 is a fragmentary, diagrammatic, top-plan view of a device for introducing a reactant into a gas flow, having a number of supply lines and partitions.
Figure 2:
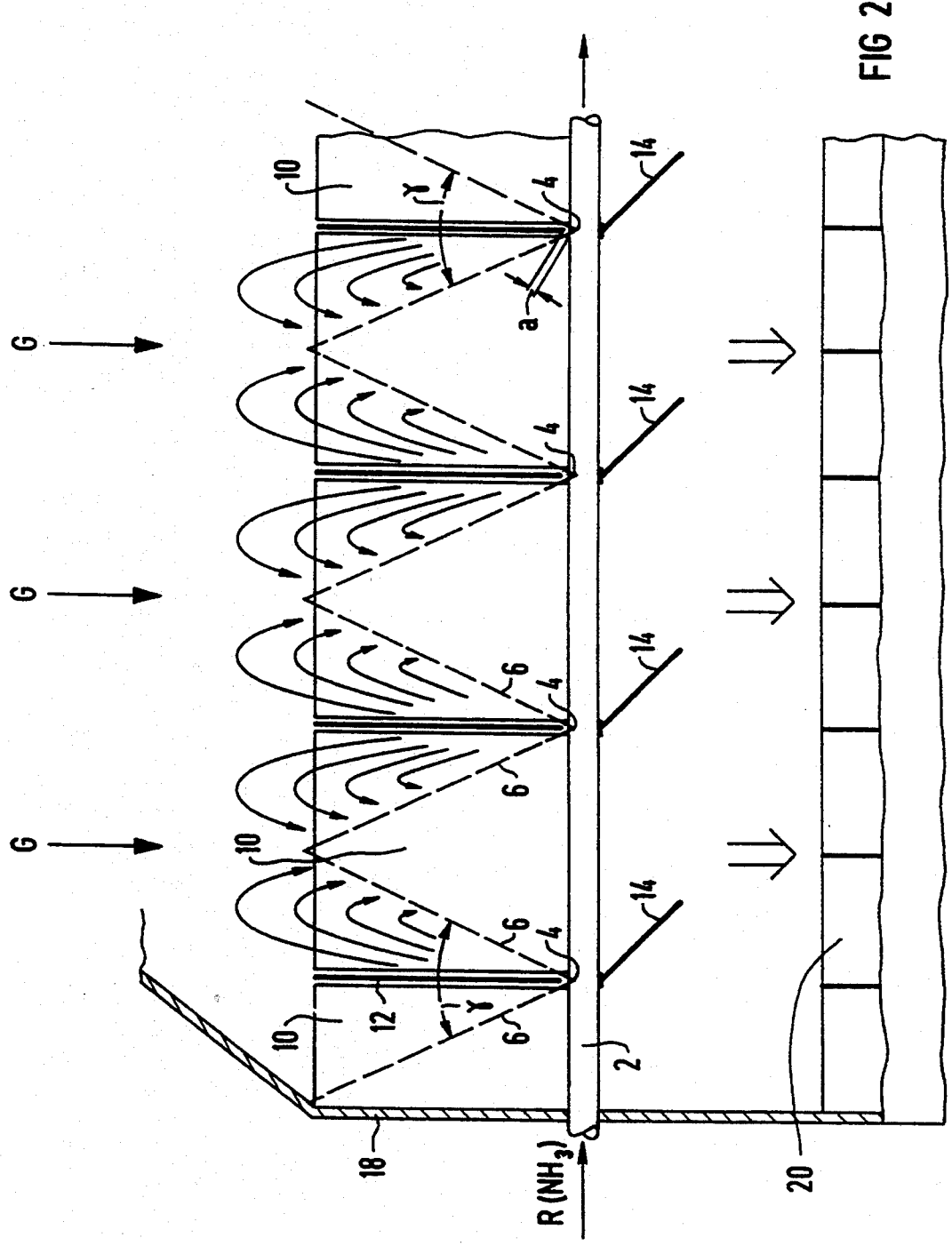
FIG. 2 is a fragmentary, side-elevational view of the device of FIG. 1.

Referring now in detail to FIGS. 1 and 2 of the drawing as a whole, there is seen a device having a plurality of supply lines or tubes 2 extending parallel to one another. The supply lines 2 have outlet openings 4, each being located at an equal spacing p from one another, for a liquid or gaseous reactant R. In the present case, the reactant R may be ammonia, $NH_3$. The supply lines 2 are located in a horizontal plane. The distance of the various supply lines 2 from one another is likewise the spacing p. This creates a square grid with the outlet openings 4 for the reactant R. The outlet openings or $NH_3$ ejection nozzles 4 are accordingly located on a support system of the tubes 2. This support system is simultaneously intended as a distributor system for the entire $NH_3$ injection. The support system puts the various outlet openings 4 in position relative to a non-illustrated catalytic converter. This position must be imagined as below the plane of the paper on which FIG. 1 appears. The catalytic converter may be a plate-type or honeycomb-type catalyst. A gas flow G shown in FIG. 1 flows into the plane of the paper from above. In other words, the outlet openings 4 are disposed in such a way that the reactant 4 can exit counter to the gas flow G. This is also clear particularly from FIG. 2.

FIG. 2 diagrammatically shows that the $NH_3$ gas is "injected" counter to the flow G in the form of suitable, adapted conical streams 6. The spacing p between the outlet openings 4 and the outlet angle gamma are adapted in such a way that a largely uniform distribution of the reactant R in the gas flow G ensues.

A significant aspect is that the flow stream or cone 6 of the reactant R emerging from each outlet opening 4 is split into at least two partial flows, which leads to stabilization of these partial flows. To that end, at least one baffle 12 is disposed immediately adjacent and upstream of each respective outlet opening 4, in terms of the gas flow direction. With the present square configuration of outlet openings 4, these baffles are two lengthwise baffles 10 located in a row and two crosswise baffles 12 located in a row, which are disposed at an intersecting angle of 90°. It can be seen from FIG. 1 that the individual cones 6 are each split by these baffles 10, 12 into four partial flows. Naturally, some angle of intersection other than 90° may be selected, and naturally more or fewer baffles 10, 12 at each outlet opening 4 may be chosen. For example, a star-shaped or radial configuration may be chosen.

FIGS. 1 and 2 also show that on the downstream side of each outlet opening 4 in gas flow direction, there is a mixing element 14 for turbulent mixing of the reactant R and the gas flow G. This mixing element 14 may in particular be a triangular vane or pennant disposed obliquely in the gas flow G. This vane or pennant may be secured to the applicable supply line 2 by welding, for instance. In the view of FIG. 1, the downward inclination of these mixing elements 14 is clearly shown in each case by an arrow 16. FIG. 1 also shows that the various mixing elements 14 may be rotationally staggered from one outlet opening 4 to another outlet opening 4.

The gas flow G may preferably be the flue gas flow from a gas turbine. Particularly in combined gas and steam turbine plants, a problem which arises is that there is no space behind the gas turbine for a lengthy injection device for $NH_3$ and for long mixing paths between the heating surfaces. In such an application, the advantages of the short paths in a device as shown in FIGS. 1 and 2 become especially notable.

The various baffles 10, 12 may in this case have a height of only 300 to 500 mm, for instance. The diameter of the outlet openings 4 may then be in the range from 5 to 20 mm or even up to 30 mm, and the distance p from one outlet opening 4 to the next outlet opening 4 may amount to 200 to 300 mm, for instance. In the prior art, injection devices exist in which the distance between adjacent outlet openings for the reactant $NH_3$ is at least 500 mm. Such wide spacing has to be adhered to there, because otherwise there is disadvantageous interaction between the outflowing cones. In the present invention, however, it is possible to make do with a substantially smaller spacing p, because of the provision of the aforementioned baffles 10, 12 in order to split the cones 6 into partial cones that are intrinsically stable.

The various baffles 10, 12 may be disposed with their edge at a distance "a" upstream of the applicable outlet opening 4. Depending on the application, this distance a may amount to 30 or 50 mm or more, for instance.

An important factor in the embodiment of FIGS. 1 and 2 is that the cone 6 is split into the aforementioned four partial cones. Each of these partial cones can be said to be assigned its own chamber. As a result of the splitting, the partial cones are stabilized, as already mentioned above. The mixing elements 14, for example in the form of the aforementioned triangular plates welded to the downstream facing side of the supply tubes 2, create an adequate turbulence and thus cause a homogeneous distribution of the reactant R in the gas flow G.

The injected cones 6 and the height of the partitions 10, 12 can be optimized for a particular application. Due to the cooperation with the gas flow G, the mixing is then virtually already completed in the region of the four volumes formed by the baffles or partitions 10, 12. With optimal adjustment, the baffles or partitions 10, 12 divide each of the various injected $NH_3$ cones 6 into four equal parts. The baffles or partitions additionally stabilize the four cone parts in such a way that the remaining space in the middle of the squares is filled by the ammonia flowing back again. The turbulence which is then further imposed on the gas flow G by the mixing elements 14 in any event removes any remaining differences in concentration.

As already noted above, given an optimized configuration and adjustment, it can be assumed that even in the region of NH introduction, that is in the region of the four aforementioned chambers above the delivery tube 2, largely uniform concentration profiles will prevail.

We claim:

1. A device for introducing a liquid or gaseous reactant into a flue gas flowing in a flue gas channel in a gas flow direction, comprising:
   a) a flue gas channel through which flue gas flows in a gas flow direction;
   b) at least one supply line for a liquid or gaseous reactant disposed in said flue gas channel;
   c) said at least one supply line having at least one outlet opening formed therein for the emergence of a reactant flow in a direction counter to the gas flow direction of the flue gas;
   d) said at least one outlet opening being formed in said at least one supply line on a side thereof facing against the flow of flue gas; and
   e) at least one baffle disposed immediately adjacent and upstream of said at least one outlet opening, as seen in the gas flow direction, for splitting the reactant flow emerging from said at least one outlet opening into at least two partial flows of reactant.

2. The device according to claim 1, including at least one mixing element downstream of said at least one outlet opening, as seen in the gas flow direction, for turbulent mixing of at least one of the reactant and the gas flue.

3. The device according to claim 1, wherein said at least one baffle is at least two crossed baffles disposed at said at least one outlet opening.

4. The device according to claim 3, wherein said at least two crossed baffles include one lengthwise baffle and one crosswise baffle with an angle of intersection of 90°.

5. The device according to claim 1, including at least one supply line for the reactant, said at least one supply line having a plurality of said outlet openings formed therein, each of said outlet openings having at least one of said baffles.

6. The device according to claim 5, wherein said at least one supply line is a plurality of supply lines extending parallel to one another.

7. The device according to claim 6, wherein said outlet openings are mutually spaced apart by an equal distance.

8. The device according to claim 6, wherein said baffles assigned to said outlet openings are spaced in a grid pattern.

9. The device according to claim 8, wherein said baffles are mutually spaced in a rectangular pattern.

10. The device according to claim 8, wherein said baffles are mutually spaced in a square pattern.

11. The device according to claim 5, wherein said at least one supply line is a plurality of supply lines mutually spaced in a grid pattern.

12. The device according to claim 11, wherein said supply lines are mutually spaced in a rectangular pattern.

13. The device according to claim 11, wherein said supply lines are mutually spaced in a square pattern.

14. The device according to claim 2, wherein said at least one mixing element is a vane disposed obliquely in the gas flow.

15. The device according to claim 2, including at least one supply line for the reactant, said at least one supply line having a plurality of said outlet openings formed therein, each of said outlet openings having at least one of said baffles, and said at least one mixing element being a vane disposed obliquely in the gas flow and secured to said at least one supply line.

16. The device according to claim 15, wherein said vane is welded to said at least one supply line.

17. The device according to claims 15, wherein said vane is triangular.

18. The device according to claim 3, wherein said at least two crossed baffles include a plurality of lengthwise baffles and a number of crosswise baffles crossing at intersections, and said at least one outlet opening is a plurality of outlet openings disposed adjacent said intersections.

19. The device according to claim 1, wherein said at least one baffle has a height of 300 to 500 mm.

20. The device according to claim 5, wherein said outlet openings have a diameter of approximately from 5 to 20 mm, and said outlet openings are mutually spaced apart by a distance of approximately 200 to 300 mm.

21. The device according to claim 1, including means for connecting the device in a flue of a gas turbine and wherein the gas flow is a flue gas flow of the gas turbine.

22. A device for introducing a liquid or gaseous reactant into a flue gas flowing in a flue gas channel along a gas flow direction, comprising:
   a) a flue gas channel through which flue gas flows in a gas flow direction;
   b) a supply line for a liquid or gaseous reactant disposed in said flue gas channel;
   c) said supply line having at least one outlet opening formed therein for the emergence of an ammonia flow in a direction counter to the gas flow direction of the flue gas;
   d) said at least one outlet opening being formed in said supply line on a side thereof facing against the flow of the flue gas; and
   e) at least one baffle disposed immediately adjacent and upstream of said at least one outlet opening, as seen in the gas flow direction, said at least one baffle positioned for splitting the ammonia flow emerging from said at least one outlet opening into at least two partial flows of ammonia.

23. The device according to claim 1, wherein said at least one outlet opening is disposed upstream of a catalytic converter module, containing plate-type or honeycomb-type catalytic converters.

24. The device according to claim 23, wherein the catalytic converter module is an SCR catalytic converter module.

* * * * *